United States Patent
Wang et al.

(10) Patent No.: US 10,171,715 B2
(45) Date of Patent: Jan. 1, 2019

(54) CAMERA MODULE WITH INTEGRATED CHIP-ON-BOARD IMAGE SENSING CHIP

(71) Applicant: ASIA VITAL COMPONENTS CO., LTD., New Taipei (TW)

(72) Inventors: Wei-Chuan Wang, New Taipei (TW);
Xin-Lian Cheng, New Taipei (TW);
Ting-Yu Lin, New Taipei (TW);
Chun-Mei Zhang, New Taipei (TW);
Chin-Lian Yeh, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 0 days.

(21) Appl. No.: 15/415,882

(22) Filed: Jan. 26, 2017

(65) Prior Publication Data
US 2018/0213129 A1    Jul. 26, 2018

(51) Int. Cl.
*H04N 5/225* (2006.01)

(52) U.S. Cl.
CPC ......... *H04N 5/2253* (2013.01); *H04N 5/2254* (2013.01)

(58) Field of Classification Search
CPC .. H04H 5/2252; H04H 5/2253; H04H 5/2254; H04H 5/2257
USPC .................. 250/239; 257/433–434; 348/374
See application file for complete search history.

(56) References Cited

U.S. PATENT DOCUMENTS

| | | | | |
|---|---|---|---|---|
| 6,541,284 | B2 * | 4/2003 | Lam | H01L 27/14618 257/E31.118 |
| 7,084,391 | B1 * | 8/2006 | Chen | H01L 27/14618 250/208.1 |
| 7,412,163 | B2 * | 8/2008 | Wu | G03B 17/00 16/221 |
| 2004/0056971 | A1 * | 3/2004 | Yang | H04N 5/2253 348/294 |
| 2008/0304821 | A1 * | 12/2008 | Jeung | H01L 27/14618 396/529 |
| 2014/0111684 | A1 * | 4/2014 | Corbin | H01Q 1/243 348/374 |
| 2016/0316117 | A1 * | 10/2016 | Singh | H04N 5/2254 |
| 2017/0053874 | A1 * | 2/2017 | Renaud-Bezot | H01L 23/49822 |
| 2017/0245360 | A1 * | 8/2017 | Jung | H04M 1/0264 |

* cited by examiner

*Primary Examiner* — Ngoc-Yen Vu
(74) *Attorney, Agent, or Firm* — Jackson IPG PLLC; Demian K. Jackson

(57) ABSTRACT

A camera module includes a circuit board, a camera device and an image processing chip. An image sensation chip of the camera device is directly integrated with the circuit board by means of chip-on-board (COB) manufacturing process to minify the total volume of the camera module, whereby the camera module can be disposed in a narrow space.

6 Claims, 2 Drawing Sheets

CAMERA MODULE WITH INTEGRATED CHIP-ON-BOARD IMAGE SENSING CHIP

BACKGROUND OF THE INVENTION

1. Field of the Invention

The present invention relates generally to a camera module, and more particularly to a camera module in which the image sensation chip is directly integrated with the circuit board by means of chip-on-board (COB) manufacturing process to minify the total volume of the camera module.

2. Description of the Related Art

Along with the change of times, there is a trend to develop lighter, thinner and smaller mobile device or display device for easy carriage. However, the display screen is required to be maximized. Therefore, it is derived to manufacture a slimmed mobile device or display device with a narrow frame. In accordance with the development and advance of new techniques, the present invention provides a thinner and narrower camera module with high definition, which is applicable to a display device with narrow frame. Due to the bottleneck limitation of the manufacturing technique, a conventional camera device is limited in mechanism board width and height. In addition, the size of the image processing chip and the optical lens is also one of the bottlenecks. As a result, the total width and height of the device cannot satisfy the design requirement of the slimmed display device.

A conventional camera module is mainly composed of an independent camera lens unit and a circuit board, which are electrically connected with each other. The camera lens unit itself includes an image sensation chip, a filter, a lens seat and a lens, which are overlapped with each other and packaged. Therefore, the camera lens unit has a higher height and is inapplicable to a place with limited height. As a result, such camera lens unit cannot be arranged in an existent camera module necessitating a narrow frame and having a limited space and height.

SUMMARY OF THE INVENTION

It is therefore a primary object of the present invention to provide a camera module applicable to a site with limited space.

To achieve the above and other objects, the camera module of the present invention includes a circuit board, a camera device and an image processing chip.

The camera device has an image sensation chip, a filter, a lens seat and a lens, which are sequentially overlapped and assembled with each other. The image sensation chip is electrically connected with the circuit board via multiple golden wires. The image processing chip is disposed on one side of the circuit board and covered and protected by a metal shield.

In the above camera module, the image sensation chip is directly integrated with the circuit board by means of chip-on-board (COB) manufacturing process to minify the total volume of the camera module, whereby the camera module can be disposed in a narrow space. In this case, the camera module can be more flexible disposed.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
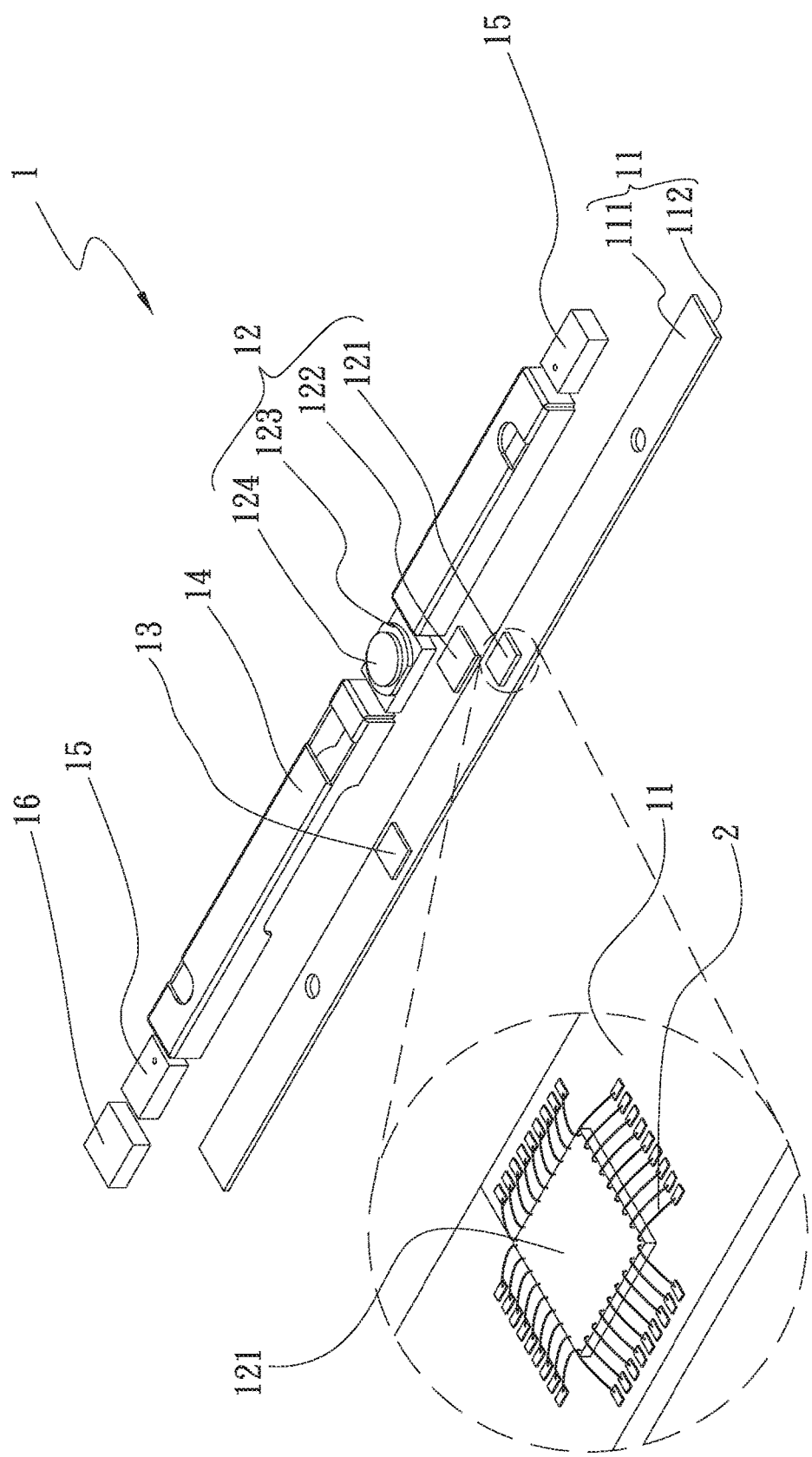
FIG. 1 is a perspective exploded view of a first embodiment of the camera module of the present invention.
Figure 2:
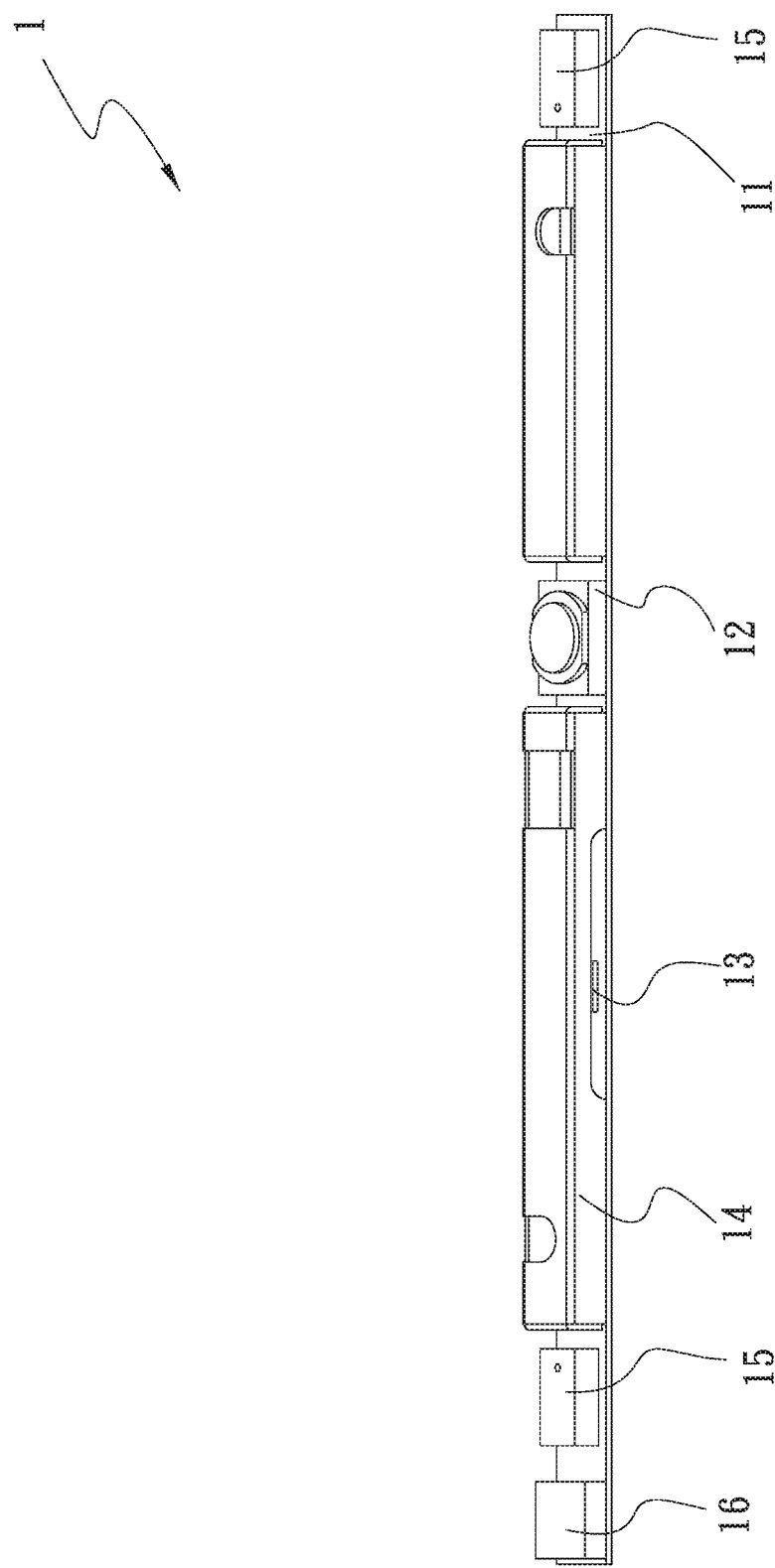
FIG. 2 is a perspective assembled view of the first embodiment of the camera module of the present invention.

Please refer to FIGS. 1 and 2. FIG. 1 is a perspective exploded view of a first embodiment of the camera module of the present invention. FIG. 2 is a perspective assembled view of the first embodiment of the camera module of the present invention. According to the first embodiment, the camera module 1 of the present invention includes a circuit board 11, a camera device 12 and an image processing chip 13.

The circuit board 11 has a first side 111 and a second side 112 respectively oppositely positioned on upper and lower sides of the circuit board 11. The camera device 12 is disposed on the first side 111.

The camera device 12 has an image sensation chip 121, a filter 122, a lens seat 123 and a lens 124, which are sequentially overlapped and assembled with each other. The image sensation chip 121 is electrically connected with the circuit board 11 via multiple golden wires 2.

The image processing chip 13 is disposed on one side of the circuit board 11 and covered and protected by a metal shield 14. The metal shield 14 is a U-shaped hollow structure body positioned over the image processing chip 13.

A microphone 15 and connectors 16 are further disposed on the first side 111 of the circuit board 11 in adjacency to the left and right sides of the camera device 12. The microphone 15 and the connectors 16 are electrically connected to the circuit board 11.

The microphone 15 serves to receive external audio signals such as voices. The camera module 1 can be further electrically connected to other external electronic components via the connectors 16 to transmit image signal and data.

The circuit board 11 is a multilayered circuit board. The connection section between the circuit board 11 and the image sensation chip 121 has a nickel/palladium golden coating.

The primary object of the present invention is to provide a camera module for improving the shortcoming of the conventional camera module. In the conditions of narrow arrangement space and limited height, the image sensation chip 121 can be connected with the circuit board 11 in such a manner that the image sensation chip 121 is directly integrated and wired and disposed on the circuit board 11 by means of chip-on-board (COB) manufacturing process. This can greatly reduce the total height of the camera module. The present invention mainly employs an ultrathin and ultranarrow camera module 1 with a width ranging from 2-3.1 mm and a height ranging from 2-2.5 mm. The ultrathin and ultranarrow camera module 1 is applicable to a mobile device to make the mobile device have smaller volume and lighter weight. Therefore, the display screen of the image display device can be maximized and the thickness of the image display device can be most thinned to beautify and more lightweight the image display device in conformity with the tide of current time.

The slimmed camera module 1 employs the micro-lens 124, the lens seat 123, the filter 122 and the image sensation chip 121 and is manufactured by means of the precise chip-on-board (COB) manufacturing process. In addition, the image sensation chip 121 and the relevant components are enclosed in the metal shield 14. The performance and primitive thereof can be still freely arranged in a narrow site.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A camera module comprising:
   a circuit board;
   a camera device having an image sensation chip, a filter, a lens seat having a receiving space receiving the filter wherein an area of the filter is larger than an area of the image sensation chip, and a lens, which are respectively sequentially overlapped and assembled with each other on a first surface of the circuit board, the image sensation chip being electrically connected with the circuit board via multiple golden wires;
   a microphone disposed on the first surface of the circuit board on both a first and a second side of the camera device and electrically connected to the circuit board; and
   an image processing chip disposed on the first surface of the circuit board and covered and protected by a metal shield.

2. The camera module as claimed in claim 1, further comprising a connector disposed on the first surface of the circuit board and electrically connected to the circuit board.

3. The camera module as claimed in claim 1, wherein the circuit board is a multilayered circuit board, a connection section between the circuit board and the image sensation chip having a nickel/palladium golden coating.

4. The camera module as claimed in claim 1, wherein the image sensation chip is connected with the circuit board by means of chip-on-board (COB) manufacturing process.

5. The camera module of claim 1, wherein the image processing chip is disposed on the first surface of the circuit board beside the camera device.

6. The camera module of claim 1, wherein the microphone is disposed on the first surface of the circuit board on both first and second sides of the image processing chip.

\* \* \* \* \*